July 1, 1924.

H. N. OTT

MICROSCOPE

Filed July 5, 1923

INVENTOR.
Harvey N. Ott,
by Parker & Brockman.
ATTORNEYS

July 1, 1924.
H. N. OTT
MICROSCOPE
Filed July 5, 1923
1,500,030
2 Sheets-Sheet 2
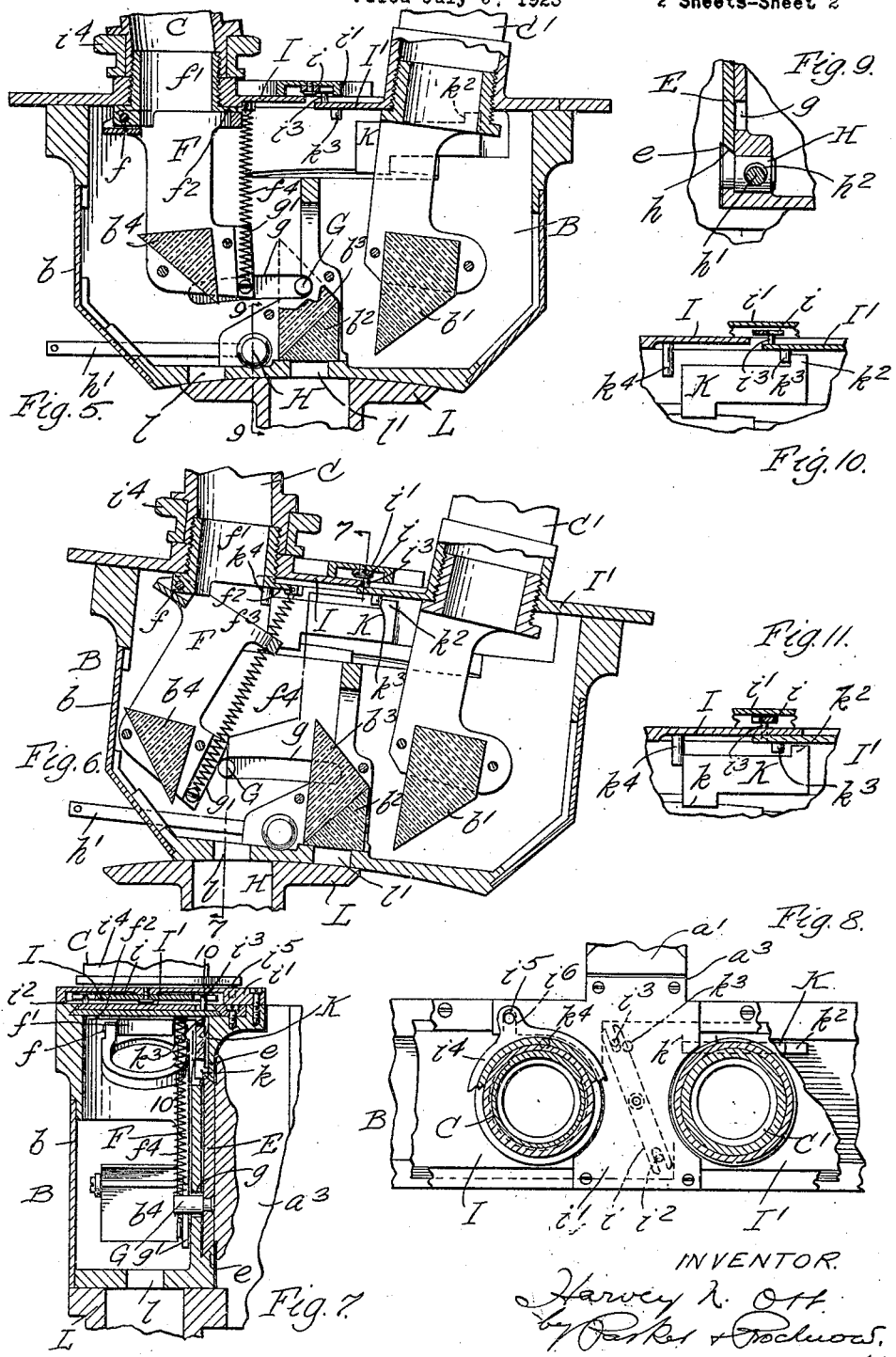
INVENTOR.
Harvey N. Ott
by Parker & Lockwood
ATTORNEYS.

Patented July 1, 1924.

1,500,030

UNITED STATES PATENT OFFICE.

HARVEY N. OTT, OF BUFFALO, NEW YORK, ASSIGNOR TO SPENCER LENS CO., OF BUFFALO, NEW YORK.

MICROSCOPE.

Application filed July 5, 1923. Serial No. 649,546.

*To all whom it may concern:*

Be it known that I, HARVEY N. OTT, a citizen of the United States, residing at Buffalo, in the county of Erie and State of New York, have invented a new and useful Improvement in Microscopes, of which the following is a specification.

This invention relates to microscopes of the kind which may be used either for monocular or binocular observation.

In microscopes as heretofore made, it is possible to adapt the instrument for either binocular or monocular observation by providing the microscope with a monocular body tube which could be readily detached from the instrument and replaced by a binocular body, and in some cases the monocular body tube and binocular body were adapted to cooperate with the same objective, so that if the microscope were focused with the monocular body tube in place thereon, the instrument would be in focus when the binocular body is substituted for the monocular body tube, and vice versa.

The objects of this invention are to provide a microscope of improved construction which can be readily adapted for either binocular or monocular observation without removing the binocular body portion from the instrument and without interfering with the objective or the focusing of the same; also to provide a microscope which is so constructed that one of the binocular eye piece tubes can be moved into a position in which its optical axis will coincide with the optical axis of the objective, so that the microscope may be used for monocular observation; also to provide a microscope of this kind with means for automatically removing the prisms of the instrument out of the line of vision when the instrument is to be used for monocular observation and for automatically returning the prisms to their correct positions for binocular observation when the eye piece tubes are positioned to enable the instrument to be used in this manner; also to improve the construction of microscopes in the other respects hereinafter specified.

In the accompanying drawings:

Figs. 5 and 6 are sectional elevations thereof, taken approximately on the optical axis of the microscope, on an enlarged scale, the parts being shown in different positions in the two figures.

Fig. 7 is a transverse sectional elevation thereof on line 7—7, Fig. 6.

Fig. 8 is a fragmentary top plan view thereof partly in section, showing the means for moving the eye piece tubes into a definite pupillary distance with reference to each other during the movement of the binocular body into position for use for monocular observation.

Fig. 9 is a fragmentary sectional elevation thereof on line 9—9, Fig. 5, showing the means for locking the binocular body to hold the same against movement.

Figs. 10 and 11 are fragmentary sectional elevations thereof on line 10—10, Fig. 7.

Figure 4:
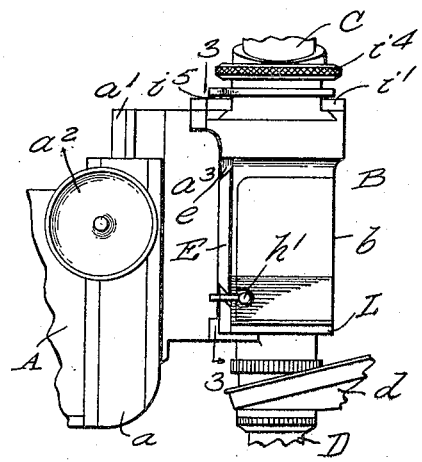
Fig. 4 is a fragmentary side elevation thereof.

The drawings show only the upper portion of a microscope, and A, Fig. 4, represents the upper portion of the usual arm rising from the base of the microscope. On this arm is mounted the usual intermediate slide $a$ which is provided with a vertical bearing adapted to cooperate with a corresponding bearing $a'$, to provide for the coarse adjustment of the microscope, which is effected by the usual means including a knurled wheel or knob $a^2$. The bearing $a'$ is formed on a vertically adjustable bracket or support $a^3$ which supports a binocular body B. This binocular body, except as hereinafter specified, may be of any usual or suitable construction and includes a housing closed by a cover or removable wall $b$ and containing the usual prisms $b'$, $b^2$ $b^3$ and $b^4$. The binocular body also has the usual eye piece tubes C and C' mounted thereon. At the lower end of the adjustable support or bracket $a^3$ for the binocular body is arranged the nose piece bracket $d$ which supports the nose piece $d'$ on which the usual objective or objectives D are mounted. When the binocular body is in its usual or normal position, as shown in Figs. 1 and 5, the light from the object passes through the objective D to the prism $b^2$ and the light is then divided in the customary manner, part of the light being reflected and passing through the prism $b'$ to the eye piece tube $C'$, and the other part of the light passing through the prisms $b^3$ and $b^4$ to the eye piece tube C, so that the microscope may be used for binocular observation.

Figure 1:
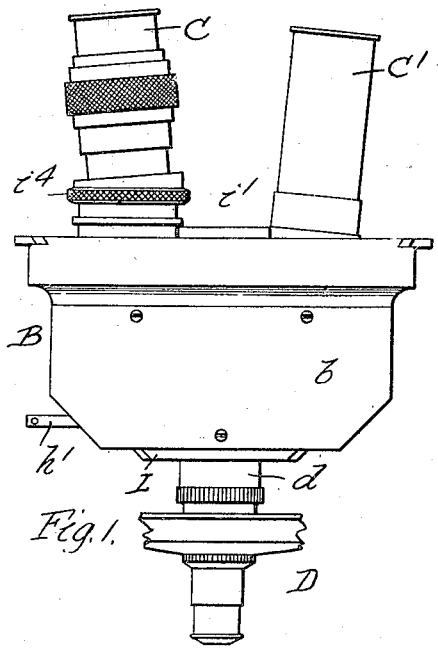
Fig. 1 is a front elevation of a part of a microscope embodying this invention, showing the binocular body portion of the microscope in position for binocular observation.
Figure 2:
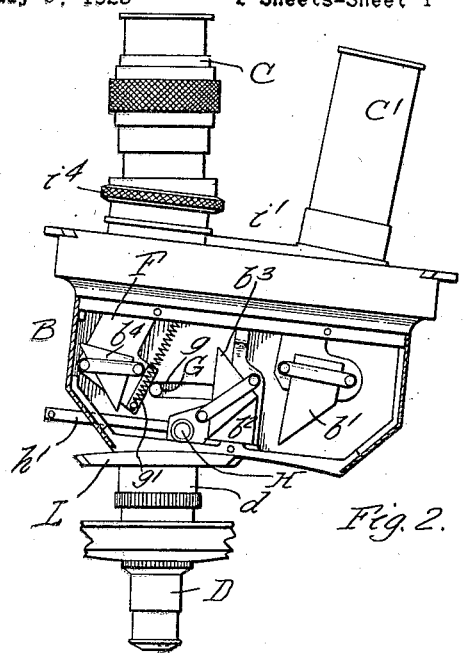
Fig. 2 is a similar view thereof, showing the eye piece tubes in position for monocular observation, the cover of the prism housing of the binocular body portion being omitted in this figure.

In order to adapt the microscope for monocular observation, the binocular body B, together with the eye piece tubes, is adapted to be moved from the position for binocular observation shown in Figs. 1 and 5, to a position in which the axis of one of the eye piece tubes coincides with the axis of the objective, as shown in Figs. 2 and 6. In the construction shown, the eye piece tubes converge and consequently, in order to move one of the eye piece tubes, for example, the tube C, into alinement with the optical axis of the objective, the binocular body must be swung on an arc of a circle. It will be understood, however, that it is not intended to limit the invention to having the binocular body move in an arc of a circle, since in microscopes in which the eye piece tubes are parallel, the movement of the binocular body will be horizontal in a direction transverse of the optical axis of the microscope. Any suitable or desired means for guiding the binocular body in its movement from one position to another may be employed. In the construction shown for this purpose, a dove-tailed guide bearing part E is provided which is arranged on the support or bracket $a^3$ and which cooperates with corresponding bearing parts $e$ of the binocular body, which bearing parts engage the upper and lower bevelled edges of the bearing part E. These bevelled edges, in the construction shown, are curved in such a manner as to cause the binocular body to move in an arc of a circle, so that the eye piece tube C will swing from its inclined position, shown in Fig. 1, to the position shown in Fig. 2, in which the optical axis of the eye piece tube coincides with the optical axis of the objective. Any other means for guiding the binocular body portion in its movement to adapt the microscope for monocular or binocular observation may be employed, if desired.

The prisms which are used in a binocular microscope serve the purpose of dividing the light from the object between the two eye piece tubes, and in case one of the eye piece tubes of a binocular microscope is to be used for monocular observation, it is desirable to move the prisms out of the path of light from the objective to the eye piece tube. During the movement of the binocular body portion from the position shown in Fig. 5, to that shown in Fig. 6, the prisms $b'$ $b^2$ $b^3$ which are mounted in fixed positions in the binocular body B will be moved with the binocular body out of the path of light from the objective, and means of suitable construction are provided for swinging the prism $b^4$ out of the optical axis of the microscope. In the construction shown for this purpose, the prism $b^4$ is mounted on a bracket or support F which is pivotally arranged on the binocular body, the bracket F being mounted by means of a pivot pin $f$ on a sleeve $f'$ secured on the binocular body portion. This sleeve is also provided with an extension or flange $f^2$ with which a projection of the bracket F is adapted to engage when the prism is in position for binocular observation, and a spring $f^4$ is provided for normally holding this bracket in this position. In order to swing the prism $b^4$ and the supporting bracket F therefor out of the optical axis of the instrument when the same is used for monocular observation, a pin G is provided which is secured to a stationary part of the instrument, for example, on the dove-tailed bearing member E, and which extends through a slot $g$ in the housing of the binocular body. This pin is adapted to strike an edge $g'$ of the bracket F as the binocular body is moved laterally into position for monocular observation, the pin causing the bracket to swing against the action of the spring $f^4$ into the position shown in Figs. 2 and 6, so that the prism $b^4$ is swung relatively to the binocular body out of the optical axis of the microscope. When the binocular body is moved in the reverse direction to adapt the instrument for binocular observation, the bracket F is moved away from the pin G so that the spring $f^4$ will draw the bracket back into its normal position, as shown in Fig. 5. Other means for moving the prism out of the optical axis of the microscope when used for binocular observation may be employed, if desired.

Means of any suitable kind may be provided for limiting the movement of the binocular body in opposite directions so that when the binocular body has been moved to one end of its path of movement, it will be in position to adopt the microscope for binocular observation and at the other end of its path of movement the instrument will be adapted for monocular observation. In the construction shown for this purpose, the pin G and slot $g$ are so proportioned as to stop the binocular body portion at the opposite ends of its path of movement, so that when the pin is in engagement with one end of the slot, as shown, for example, in Fig. 5, the microscope is set for binocular observation, and when the pin is at the other end of the slot, as shown in Figs. 2 and 6, the microscope is set for monocular observation. Means are preferably also provided for locking the binocular body in either of its two operative positions, and for this purpose a slidable locking pin H, Fig. 9, is employed, which has a bevelled face $h$ adapted to frictionally engage the lower edge of the dove-tailed bearing member E, and an actuating pin or rod $h'$ is provided for this purpose, which is suitably journalled in the binocular body and has an eccentric $h^2$ on the end thereof which engages the locking pin H to move the same into and out of position to clamp the dove-tailed bearing member E. Other means for locking the binocular body against movement may be provided.

It is customary to provide binocular microscopes with means for moving the eye piece tubes toward and from each other to adjust these tubes for different pupillary distances, these means usually including slides or plates I I' on which the eye piece tubes are mounted, and which are movable transversely with reference to the binocular body, the two slides being connected by means of a lever $i$ pivoted on a plate or part $i'$ which is fixed to the binocular body. This lever has longitudinal slots in its ends and pins $i^2$ and $i^3$ secured respectively to the slides I and I' engage in the slots in the opposite ends of the lever $i$ so that a movement of one of the eye piece tubes and its corresponding slide will be transmitted to the other slide to produce a corresponding movement thereof in the opposite direction. In order to facilitate the lateral adjustment of the eye piece tubes relatively to each other, an adjusting ring $i^4$ is preferably provided around one of these tubes and has a pin $i^5$ engaging in a slot $i^6$ on a fixed part of the binocular body so that a turning of the adjusting ring $i^4$ will produce a transverse movement of one of the eye piece tubes. These means for obtaining adjustment for different pupillary distances have heretofore been used on microscopes, and of themselves constitute no part of this invention.

Figure 3:
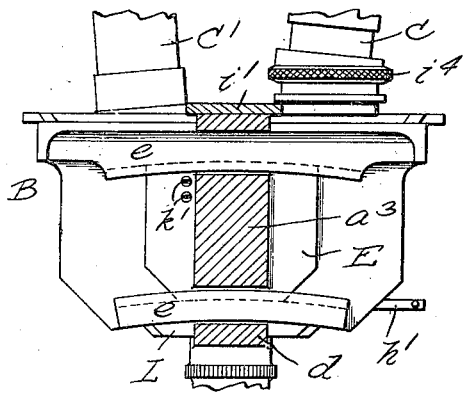
Fig. 3 is a fragmentary rear view of the binocular body portion, partly in section, on line 3—3, Fig. 4.

Means are provided, in the construction shown, for preventing different adjustments of the eye piece tubes relatively to each other from interfering with the placing of the tube C into the optical axis of the microscope when the binocular body is swung to one end of its path of movement, since obviously, if the binocular body is given a definite movement, then if the eye piece tube C would not swing as far as the optical axis, and if the eye piece tubes were set for a small pupillary distance, this same movement of the binocular body would move the tube C' beyond the optical axis of the objective. In order to overcome this difficulty, means are provided for automatically moving the eye piece tubes to definite positions during the movement of the binocular body to its position for monocular observation, and for sake of convenience the position which the tube C would occupy when the tubes are adjusted for the normal or average pupillary distance may be selected. In the construction shown for this purpose, a stop plate K is provided which is mounted on a fixed part of the microscope in any suitable manner. In the construction shown, the plate K has a supporting arm or extension $k$, Fig. 7, which is connected with the dove-tailed bearing member E in any suitable manner, for example, by means of a pair of screws $k'$, Fig. 3, and the stop plate K has a stop shoulder $k^2$ which is adapted to engage with a pin $k^3$ secured on the slide plate I'. Another pin $k^4$ secured on the other slide plate I extends downwardly in a position to engage one end of the stop plate K. Consequently when the eye piece tubes are set closer together than a definite predetermined distance, which may be the normal pupillary distance, the pin $k^4$ will strike the end of the stop plate K before the pin $k^3$ strikes the stop shoulder $k^2$, see Fig. 11, and before the binocular body has been swung into its position for monocular observation, and will prevent further movement of the slide plate I, so that when the binocular body has been swung to the limit of its movement, the optical axis of the eye piece tube C will be in coincidence with the optical axis of the objective. When the eye piece tubes are adjusted for a distance greater than the predetermined pupillary distance, the pin $k^3$ will strike the stop shoulder $k^2$ of the stop plate K before the pin $k^4$ strikes the stop plate K, as shown in Fig. 10, and cause the slide plate I' to stop. Owing to the continued movement of the binocular body on which the slide plate I' is mounted, the movement of the binocular body relatively to the slide plate I' will cause the other slide plate I through the medium of the lever $i$, to be moved in the same direction of movement, but at a greater rate of speed than the binocular body. Consequently when the binocular body has been moved to the limit of its movement, the eye piece tube C will also have reached the predetermined position in which the optical axes of the eye piece tube C and the objective coincide. When the eye piece tube C is in its operative position for monocular observation, both of the pins $k^3$ and $k^4$ will engage the stop plate K, as shown in Fig. 6. Consequently, when the binocular body is swung to the limit of its movement for monocular observation, the eye piece tube C will always be in the same predetermined position with reference to the binocular body, so that the swinging of the binocular body toward its position for monocular observation will bring the eye piece tube C into the optical axis of the microscope, regardless of its prior adjustment for pupillary distance. Other means for moving the eye piece tube into coincidence with the optical axis of the objective may be provided if desired.

In the operation of the microscope, if the same is set for binocular observation and it is desired to change the instrument for monocular observation, it is only necessary to unlock the monocular body by a half turn of the rod or pin $h'$ and to push the binocular body to the limit of its movement to the right, and then again lock the binocular body. The microscope is then ready for monocular observation. During the movement of the binocular body, the prism carrying bracket or support F is swung into the position shown in Figs. 2 and 6 by means of the pin G which engages the bracket F. If the pupillary distance between the eye piece tubes is the normal or average distance, no movement of the eye piece tube C relatively to the binocular body occurs. If the eye piece tubes are set for greater or less pupillary distances than the normal, the stop plate K, cooperating with one or the other of the pins $k^3$ and $k^4$ will cause the eye piece tube C to move relatively to the binocular body into its predetermined position. When the microscope is to be changed from monocular to binocular observation, the binocular body is moved back to its original position, and if the pupillary distances between eye pieces required by the user is other than the normal or average, the eye piece tubes must be adjusted for the desired pupillary distance. It will be noted that a hole $l$ is provided in the binocular body, through which light may pass from the objective to the eye piece tube when the microscope is used for monocular observation, and this hole, as well as the hole $l'$ used for binocular observation, is covered by a plate L when not in use, to exclude extraneous light as well as dust and the like.

The microscope described has the advantages that the instrument can be instantly changed from a binocular to monocular one and vice versa, and that no special eye piece tube need be provided for monocular observation. The focus of the microscope is not altered by the change in position of the binocular body.

I claim as my invention:

1. In a binocular microscope, the combination of an objective, a pair of eye piece tubes which are arranged at opposite sides of the optical axis of the objective when the microscope is used for binocular observation, one of said eye piece tubes being movable into a position in which its optical axis is in coincidence with the optical axis of the objective.

2. In a binocular microscope, the combination of an objective, a pair of eye piece tubes both of which are arranged out of the optical axis of the objective when the microscope is used for binocular observation, one of said eye piece tubes being movable into alinement with said optical axis to adapt the microscope for monocular observation.

3. In a binocular microscope, the combination of an objective, a pair of eye piece tubes both of which are arranged out of the optical axis of the objective when the microscope is used for binocular observation, means for projecting light from said objective to both of said eye piece tubes, one of said eye piece tubes being movable into alinement with said objective for adapting the microscope for monocular observation, and means for moving said light projecting means out of the path of light from said objective to said eye piece tube when the microscope is used for monocular observation.

4. In a binocular microscope, the combination of an ojective, a pair of eye piece tubes both of which are arranged out of the optical axis of the objective when the microscope is used for binocular observation, means for projecting light from said objective to both of said eye piece tubes, one of said eye piece tubes being movable into alinement with said ojective for adapting the microscope for monocular observation, and means actuated by the movement of said eye piece tube for moving said light projecting means out of the path of light from said objective to said eye piece tube when the microscope is used for monocular observation.

5. In a binocular microscope, the combination of an objective, a pair of eye piece tubes both of which are out of the optical axis of the objective when the microscope is used for binocular observation, one of said eye piece tubes being movable into operative relation to said objective to adapt the microscope for monocular observation, and means for moving parts used in connection with binocular observation out of the path of light from said objective to said eye piece tube when the microscope is used for monocular observation.

6. In a microscope, the combination of an objective, a binocular body having a pair of eye piece tubes for binocular observation, said binocular body being movable into a position for placing one of said eye piece tubes into operative relation to said objective to adopt the microscope for monocular observation, and means operated by the movement of said binocular body to move parts carried by said binocular body out of the path of light from said objective to said eye piece tube.

7. In a microscope, the combination of an objective, a binocular body having a pair of eye piece tubes for binocular observation, and light distributing means for projecting light from said objective to said eye piece tubes, said binocular body being movable into a position to place one of said eye piece tubes into alinement with said objective, and means actuated by the movement of said binocular body to move said light distributing means out of the path of light from said objective to said eye piece tube.

8. In a microscope, the combination of an objective, a binocular body having a pair of eye piece tubes for binocular observation, a prism for distributing light from said objective to said eye piece tubes, said binocular body being movable into a position for placing one of said eye piece tubes into operative alinement with said objective for monocular observation, and means actuated by the movement of said binocular body for moving said prism out of the path of light from said objective to said eye piece tube.

9. A microscope which is interchangeable for use for monocular and binocular observation, including an objective, a binocular body, eye piece tubes on said binocular body, said binocular body being adapted to occupy a position in which the axes of neither of said eye piece tubes is coincident with the axis of said objective, when used for binocular observation, and to occupy a position in which the axis of one of said eye piece tubes is in coincidence with the optical axis of the objective when the microscope is used for monocular observation, a prism movably mounted in operative relation to said eye piece tube to reflect light from the objective to said eye piece tube, and means for moving said prism out of operative relation to said eye piece tube when said binocular body is in position for monocular observation.

10. A microscope which is interchangeable for use for monocular and binocular observation, including an objective, a binocular body, eye piece tubes on said binocular body, said binocular body being adapted to occupy a position in which the axes of neither of said eye piece tubes is coincident with the axis of said objective, when used for binocular observation, and to occupy a position in which the axis of one of said eye piece tubes is in coincidence with the optical axis of the objective when the microscope is used for monocular observation, a prism movably mounted in operative relation to said eye piece tube to reflect light from the objective to said eye piece tube, and means actuated by the movement of said binocular body from its position for binocular observation to its position for monocular observation to move said prism out of operative relation to said eye piece tube.

11. A microscope which is interchangeable for use for monocular and binocular observation, including an objective, a binocular body, eye piece tubes on said binocular body, said binocular body being adapted to occupy a position in which the axes of neither of said eye piece tubes is coincident with the axis of said objective, when used for binocular observation, and to occupy a position in which the axis of one of said eye piece tubes is in coincidence with the optical axis of the objective when the microscope is used for monocular observation, a prism movably mounted in operative relation to said eye piece tube to reflect light from the objective to said eye piece tube, means actuated by the movement of said binocular body from its position for binocular observation to its position for monocular observation to move said prism out of operative relation to said eye piece tube, and means for returning said prism to its normal position when said binocular body is moved from the position for monocular observation to a position for binocular observation.

12. In a binocular microscope, the combination of an objective, a pair of eye piece tubes both of which are arranged out of the optical axis of the objective when the microscope is used for binocular observation, one of said eye piece tubes being movable into alinement with said optical axis to adapt the microscope for monocular observation, a prism movably arranged in operative relation to said eye piece tube for use in binocular observation, and means for moving said prism out of operative relation to said eye piece tube when said eye piece tube is moved into position for monocular observation.

13. In a binocular microscope, the combination of an objective, a pair of eye piece tubes both of which are arranged out of the optical axis of the objective when the microscope is used for binocular observation, a prism movably arranged in operative relation to said eye piece tube for use in binocular observation, means for moving said prism out of operative relation to said eye piece tube when said eye piece tube is moved into position for monocular observation, and means for returning said prism to its operative relation to said tube when said tube is moved into a position for adapting the microscope for binocular observation.

14. In a binocular microscope, the combination of an objective, a pair of eye piece tubes both of which are arranged out of the optical axis of the objective when the microscope is used for binocular observation, one of said eye piece tubes being movable into alinement with said optical axis to adapt the microscope for monocular observation, a prism, a support for said prism which holds said prism in operative relation to said eye piece tube when said tube is in position for adapting the microscope for binocular observation, and means for moving said support to place said prism out of operative relation to said tube when said tube is moved into a position for monocular observation.

15. In a binocular microscope, the combination of an objective, a pair of eye piece tubes both of which are arranged out of the optical axis of the objective when the microscope is used for binocular observation, means for guiding one of said eye piece tubes into alinement with said optical axis to adapt the microscope for monocular observation, a prism, a support for said prism which holds said prism in operative relation to said eye piece tube when said tube is in position for adapting the microscope for binocular observation, and a part on a fixed portion of said microscope which is adapted to engage said support to move the same into a position to place said prism out of operative relation to said tube when said tube is moved into a position for monocular observation.

16. In a binocular microscope, the combination of an objective, a pair of eye piece tubes both of which are arranged out of the optical axis of the objective when the microscope is used for binocular observation, means for guiding one of said eye piece tubes into alinement with said optical axis to adapt the microscope for monocular observation, a prism, a support for said prism which holds said prism in operative relation to said eye piece tube when said tube is in position for adapting the microscope for binocular observation, a part on a fixed portion of said microscope which is adapted to engage said support to move the same into a position to place said prism out of operative relation to said tube when said tube is moved into a position for monocular observation, and a spring for returning said support to a position for supporting said prism in operative relation to said tube.

17. In a microscope, the combination of an objective, a binocular body having a pair of eye piece tubes mounted thereon for binocular observation, means on said binocular body for adjusting said tubes thereon for different pupillary distances, said binocular body being movable into a position for placing one of said eye piece tubes into operative relation to said objective for monocular observation, and means for placing said eye piece tube into a definite predetermined position relatively to said binocular body, when said microscope is used for monocular observation.

18. In a microscope, the combination of an objective, a binocular body having a pair of eye piece tubes mounted thereon for binocular observation, means on said binocular body for adjusting said tubes thereon for different pupillary distances, said binocular body being movable into a position for placing one of said eye piece tubes into operative relation to said objective for monocular observation, and means actuated by the movement of said binocular body into its position for monocular use, for placing said eye piece tubes into a predetermined position relatively to said binocular body.

19. In a microscope, the combination of an objective, a binocular body having a pair of eye piece tubes mounted thereon for binocular observation, means on said binocular body for adjusting said tubes thereon for different pupillary distances, said binocular body being movable into a position for placing one of said eye piece tubes into operative relation to said objective for monocular observation, light distributing means for projecting light from said objective to said eye piece tubes, when said microscope is used for binocular observation, means for placing said eye piece tube into a definite position relatively to said binocular body when said body is moved into a position for monocular observation, and means for moving said light distributing means out of the path of light from said objective to said eye piece tube when said tube is in a position for monocular observation.

20. In a microscope, the combination of an objective, a binocular body having a pair of eye piece tubes mounted thereon for binocular observation, means on said binocular body for adjusting said tubes thereon for different pupillary distances, said binocular body being movable into a position for placing one of said eye piece tubes into operative relation to said objective for monocular observation, light distributing means for projecting light from said objective to said eye piece tubes when said microscope is used for binocular observation, means actuated by the movement of said binocular body into position for monocular observation to place said eye piece tubes in a definite position relatively to said binocular body, and means actuated by said movement of said binocular body for moving said light distributing means out of the path of light from said objective to said eye piece tube when said tube is in a position for monocular observation.

21. In a microscope, the combination of an objective, a binocular body having a pair of eye piece tubes slidably mounted thereon for adjusting said tubes for different pupillary distances, said binocular body being movable relatively to said objective for placing one of said eye piece tubes into alinement with said objective to adapt the microscope for monocular observation, and means actuated by the movement of said binocular body for placing said eye piece tube into definite relation to said binocular body.

22. In a microscope, the combination of an objective, a binocular body having a pair of eye piece tubes slidably mounted thereon for adjusting said tubes for different pupillary distances, said binocular body being movable relatively to said objective for placing one of said eye piece tubes into alinement with said objective to adapt the microscope for monocular observation, and stop means mounted on a fixed part of said microscope and adapted to cooperate with said slidable eye piece tubes to cause the eye piece tube which is used for monocular observation to be moved into a definite position relatively to said binocular body.

23. In a microscope, the combination of an objective, a binocular body having a pair of eye piece tubes slidably mounted thereon for adjusting said tubes for different pupillary distances, said binocular body being movable relatively to said objective for placing one of said eye piece tubes into alinement with said objective to adapt the microscope for monocular observation, stop means mounted on a fixed part of said microscope, and means connected with said eye piece tubes for engaging said stop means to cause said tube which is used for monocular observation to be moved into a definite position relatively to said binocular body.

24. In a microscope, the combination of an objective, a binocular body having a pair of eye piece tubes slidably mounted thereon for adjusting said tubes for different pupillary distances, means mounted on said binocular body and connecting said tubes for causing said tubes to move to different positions at equal distances from the optical axis of said objective, said binocular body being movable relatively to said objective for placing one of said eye piece tubes into alinement with said objective for adapting the microscope for monocular observation, a stop plate mounted on a fixed part of said microscope, and parts connected with said tubes and cooperating with said stop plate for causing the eye piece tube which is used for monocular observation to move to a predetermined position relatively to said binocular body.

25. In a microscope, the combination of an objective, a binocular body having a pair of eye piece tubes slidably mounted thereon for adjusting said tubes for different pupillary distances, means mounted on said binocular body and connecting said tubes for causing said tubes to move to different positions at equal distances from the optical axis of said objective, said binocular body being movable relatively to said objective for placing one of said eye piece tubes into alinement with said objective for adapting the microscope for monocular observation, a stop plate mounted on a fixed part of said microscope, and parts connected with each of said eye piece tubes and adapted to engage with said stop plate, one of said parts when engaging said stop plate being adapted to cause the eye piece tube which is used for monocular observation to move in one direction relatively to said binocular body into a definite position and the other of said parts being adapted to cause said eye piece tube to move in the opposite direction relatively to said binocular body to said definite position.

26. In a microscope, the combination of an objective, a binocular body having a pair of eye piece tubes slidably mounted thereon for adjusting said tubes for different pupillary distances, said binocular body being movable relatively to said objective for positioning one of said eye piece tubes into operative relation to said objective, and means actuated by the movement of said binocular body for positioning said eye piece tube with its optical axis in coincidence with the optical axis of the objective.

27. A convertible microscope having an objective and a pair of eyepiece tubes, said objective and eyepiece tubes being relatively movable into a position for binocular observation and into another position in which one of said eyepiece tubes is in operative relation to said objective for monocular observation.

28. A convertible microscope having a binocular body portion and an objective, and guide means for permitting relative movement of said body portion and objective to place said parts into positions for either binocular or monocular observation.

29. A convertible microscope having an objective and a pair of eyepiece tubes, said objective and eyepiece tubes being relatively movable into a position for binocular observation and into another position in which one of said eyepiece tubes is in operative relation to said objective for monocular observation, means for projecting light from said objective to both of said eyepiece tubes when the same are used for monocular observation, and means for rendering said light projecting means inoperative when the microscope is used for monocular observation.

HARVEY N. OTT.